Nov. 19, 1957  B. I. SEEGER  2,813,691
AUTOMATIC CONTROL FOR AIRPLANE FUEL TANK
VENTS OPERABLE DURING DIVING
Filed May 3, 1954
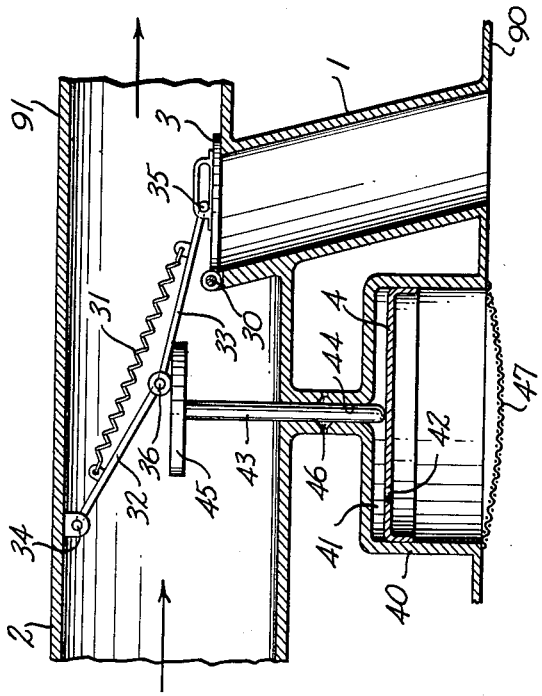
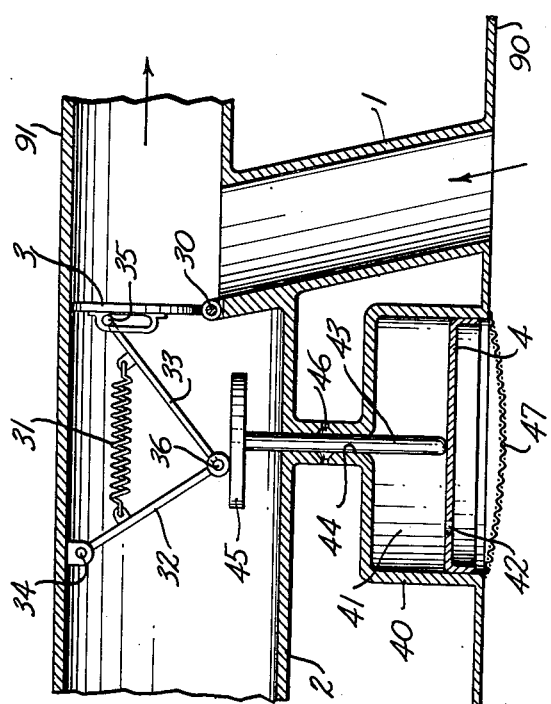
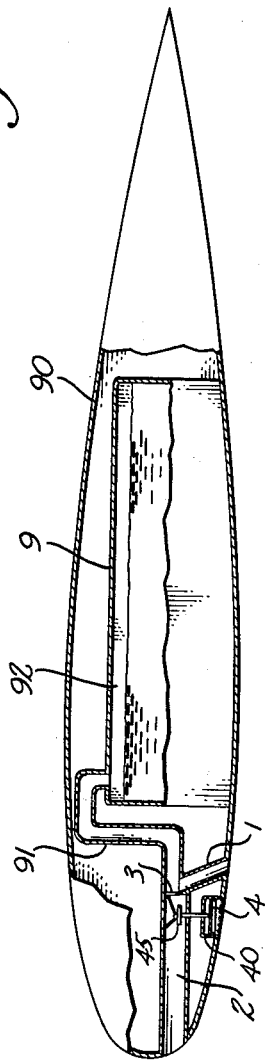
INVENTOR.
BERNARD I. SEEGER
BY
Reynolds, Beach & Christensen
ATTORNEYS

United States Patent Office 2,813,691
Patented Nov. 19, 1957

2,813,691

AUTOMATIC CONTROL FOR AIRPLANE FUEL TANK VENTS OPERABLE DURING DIVING

Bernard I. Seeger, Seattle, Wash., assignor to Boeing Airplane Company, Seattle, Wash., a corporation of Delaware Application May 3, 1954, Serial No. 427,234

6 Claims. (Cl. 244—135)

This invention concerns the problem of maintaining adequate pressure upon the fuel in the fuel tank of an airplane, particularly during rapid descent such as occurs in diving. Unless an adequate pressure, approximately equal to or exceeding ambient pressure, is maintained on the fuel in the tank at all times, the fuel will not be fed properly to the fuel pump and so to the engine, and excessive vaporization of fuel may result, and will pass out through the vent pipe which is always provided for the purpose of preventing the accumulation of excessive pressure. It will be obvious that an airplane which dives from a higher to a lower altitude has the lower pressure of the upper altitude imposed upon its fuel in the tank at the initiation of the dive, and the rapidly increasing pressure of the lower altitude attained during the dive can not ordinarily enter the fuel tank through the vent pipe and increase the pressure upon the fuel in the tank sufficiently rapidly, that is, at a rate corresponding to the rate of loss of altitude. Particularly is this so unless the airplane fuel tank is provided with a very large vent pipe, which is undesirable for other reasons. The excess of external over internal pressure may even become so great as to cause structural collapse of the fuel tank. While pressurization of the fuel tank can be resorted to, it is undesirable that this be continuous, and it is an added complication to attempt to provide mechanism for positive pressurization operable only during diving.

The present invention is directed to the problem of maintaining adequate pressure within the fuel tank during such rapid descent, or diving, automatically and without the provision of positive mechanism such as a connection to a compressor or the like, but instead merely by taking advantage of the ram pressure developed during the dive. It is, however, undesirable to apply such ram pressure to the fuel tank at all times, and so according to the present invention there are provided valve means which control alternatively and mutually exclusively the application of ambient static pressure to the fuel tank, or of dynamic ram pressure to the same, the valve means being operable automatically in accordance with conditions obtaining alternatively during the dive, or during normal flight, to be retained normally in a position closing off ram pressure from the tank, but opening during diving to admit ram pressure and to close off the tank from ambient static pressure. Such mechanism, according to the present invention, is resiliently self-restoring to its normal position, in general accordance with restoration of pressure in the fuel tank space to normal. Its movement from its normal position to the abnormal position, wherein ram pressure is admitted to the fuel tank, may be accomplished by one or another of two means, or, preferably, conjointly by the two. One such means consists of the impingement of ram pressure upon a vane which is part of the valve means, whether the same be separate from or itself constituting a butterfly valve, in opposition to spring means tending to hold the same in its normal position under all conditions of normal flight, but chosen to be of a strength to yield or to approach yielding when ram pressure increases to the value it would attain during a dive. Another such means consists of a device which is sensitive to rate-of-pressure change, whereby, when the static pressure changes rapidly, as it does during a dive, a valve of any preferred type, or of the butterfly type described, will be operated to move it into a position to admit ram pressure to the tank, and to close off ambient pressure from the tank, but which is self-restoring when the rate-of-pressure-change becomes more nearly normal, to permit the valve means to move back to its normal position, under the influence of yieldable means, and so to close off ram pressure from the tank and to admit the normal ambient static pressure to the same.

The present invention affords several advantages. First, it is light and extremely simple, and entirely automatic in operation. It permits the use of a smaller vent line without continuous pressurization of the fuel tank. The valve means is so constructed that it can never obstruct the tank vent, but always leaves one or the other connection to pressure open. Furthermore, the particular constructional form shown, and which will be described in detail hereafter, is designed to accomplish movement of the valve and vane, which in this form are one and the same, from one position to the other, and to stay in a given position, without hunting. No secure valve seat is required, for the leakage factor is quite unimportant, and large valve leakage tolerance is permitted.

The invention will be better understood from the following description of a typical and somewhat diagrammatically shown form.

Figure 1 is a general sectional view, idealized and diagrammatically shown, of an airplane fuel tank, and its vent system incorporating the present invention.

Figure 2 is a detail sectional view of the valve means and its operating mechanism, with parts shown in the normal position, and Figure 3 is a view similar to Figure 2, showing parts in the abnormal position, such as they would assume during diving.

The fuel tank 9 is represented as housed within an airplane wing 90, and to it is connected a vent pipe 91, by means of which the space 92 within the tank is afforded communication with the atmosphere. According to the present invention, the vent pipe 91, at the end opposite that which connects to the tank, is formed with two branches. The branch 1 connects, generally speaking, to ambient static pressure, that is to say, to a portion of the wing 90 which is not particularly subject to ram pressure, although it may be, and preferably is, in a positive pressure area. The branch 2, on the other hand, opens forwardly in an area where ram pressure is highest during a dive; for instance, it opens to the leading edge of the wing, as shown in Figure 1.

At the junction between the branches 1 and 2 and their connection to the vent pipe 91, a valve 3 is mounted. This may take any suitable shape, but preferably, and for a reason which will shortly appear, it is formed as a vane or butterfly valve, pivotally mounted at 30, of a size and shape to substantially close off the ambient pressure branch 1, or to close off the ram pressure branch 2, from any connection to the vent pipe 91. Whatever form the valve 3 may take, it is so constructed and arranged that it will close off one branch or the other, but when it closes off any one branch, the other branch is freely open.

It is convenient to utilize the valve 3 as a vane for impingement by ram air, in addition to its function as a valve. A vane so subject to impingement is in any event part of the valve means, whether separate from the valve or itself constituting the valve closure, and whether located in the ram pressure branch 2 or elsewhere. Being, in the form illustrated, disposed in the branch 2 transversely to the direction of movement of the ram air through such branch, it will be impinged by this ram air at all times, and urged thereby to rotate into a position to open the ram pressure branch 2 to the vent pipe 91, and to close off the ambient static pressure branch 1. It may readily be restrained from such movement during all normal flight by yieldable means of a strength properly chosen so as to resist its shifting from the normal position of Figure 2 to the abnormal position of Figure 3. For instance, a tension spring 31 may be interposed between articulated links 32 and 33, the first pivotally and fixedly mounted at 34, and the other pivotally and shiftably connected at 35 to the valve 3. By choosing a spring of proper strength it will normally resist movement of the vane and conjointly movable (or identical) valve from the position of Figure 2, but will yield upon the imposition of a sufficient force upon the vane, either by impingement or as will be explained later, or both, to permit its movement to the position of Figure 3.

In the normal position of Figure 2 it is clear that ram pressure, by way of branch 2, is denied access to the vent pipe 91, but that the ambient static pressure, by way of branch 1, is admitted to the vent pipe 91, and so to the space 92 within the tank 9. When the valve means, including this vane, has been moved to the abnormal position of Figure 3, ambient pressure by way of the branch 1 is cut off from the vent pipe 91, but ram pressure by way of the branch 2 is admitted to the vent pipe 91, and so is applied within the space 92 of the fuel tank.

It is preferred that the valve means be operable primarily, not by impingement, as described above, although that may be used to assist operation of the valve, but primarily by the device which will now be described, which is sensitive to rate-of-pressure-change. Such a device incorporates a pressure-sensitive element such as the piston 4, received and shiftable within a housing 40, in such manner that one face of the piston 4 is freely open to ambient static pressure, but the space 41, with which the opposite face of the piston communicates, is only restrictedly in communication with ambient pressure by way of a bleed port 42. Such a bleed port is shown in the piston, but it is immaterial whether it be located there or in the housing. The bleed port 42 is of such size that under all normal flight conditions the pressure applied to the two faces of the piston 4 is substantially equal, but during very rapid change in pressure the static pressure on the opposite faces of the piston can not be equalized through the restricted bleed port 42, and become unbalanced. Since at the initiation of a dive the static pressure applied to the two faces of the piston is lower than the pressure which is applied to its outer face as the dive proceeds, it is evident that the unbalance of pressure on the two faces of the piston will cause the piston to move inwardly of its housing 4, or upwardly as shown in the drawings, from the normal position of Figure 2 to the abnormal position of Figure 3. This condition will persist until, by leakage through the bleed port 42, as the diving airplane levels off, equalization of pressure on the two faces of the piston is approached or accomplished.

The pressure-sensitive element is operatively connected to accomplish movement of the valve 3 from the normal position of Figure 2 to the abnormal or diving position of Figure 3, and as a simple means of accomplishing such movement the piston is shown connected to a stem 43, guided in a bore 44 extending from the housing 40 and into, for instance, the ram pressure branch 2. Within the branch 2 it is provided with a table 45, whereon the pivot juncture 36 between the links 32 and 33 bears. This juncture 36 is pressed to the table 45 by the force of the spring 31. When the piston 4 rises within its housing 40 the table 45 presses upwardly upon the juncture 36, distending the spring 31 and moving the valve 3 from the normal position of Figure 2 to the abnormal position of Figure 3.

Leakage of ram pressure through the bore 44, unless carefully sealed, might affect pressure within the chamber 41 above the piston. To avoid this in a simple manner, a bleed port or ports 46 are provided in the bore 44 between the bore and ambient static pressure, to provide a leakage path for any ram pressure which may follow down the stem 43.

The housing 40 may be located in a region where it is subject primarily to ambient pressure, although again it may be in a positive static pressure region of the wing, as shown in Figure 1. It may be suitably screened, as indicated at 47, to avoid any disturbance of its normal functioning, as for instance by dust arising during take-off or landing.

It is preferred that both expedients, the location of the vane 3 for impingement by ram pressure and the piston 4, be employed in conjunction with the present invention. Were the vane to be operable wholly by impingement, it is likely that it would occasionally flutter between its normal and abnormal positions. To prevent this the spring means 31 is made strong enough that impingement will not alone cause such movement from its normal position, but it must be moved additionally by the movement of the piston 4. Furthermore, in leveling off from a dive the ram pressure might be materially reduced to a point where if impingement alone were relied on to move the valve to the Figure 3 position, it would return prematurely to the normal position of Figure 2, and before the static pressure in the tank space 92 had been properly adjusted. The delaying effect of the piston 4, and the necessity for approaching equalization of pressures applied to its opposite faces, will prevent such premature return of the valve 3 to its normal position.

I claim as my invention:

1. For use in an aircraft, in combination with a fuel tank, a vent pipe formed at one end with two branches, and communicating at its opposite end with the interior of said tank, one of said branches opening to the surrounding atmosphere forwardly of the direction of flight, for intake of ram pressure, and the other branch opening to ambient static pressure, valve means coupled to the vent pipe and operative to substantially close off alternatively the ram pressure branch or the ambient pressure branch from the vent pipe, while leaving the other such branch open in either case, said valve means including a vane located on the aircraft in position to be impinged by ram pressure during flight, means supporting said vane and guiding the same for movement between a normal position, wherein it is subject to impingement by ram pressure, and an abnormal position under the influence of extraordinary ram pressure such as may occur during diving, resiliently yieldable means operatively connected to said vane to retain the vane in its normal position, but yieldable as a result of extraordinary ram pressure for movement of the vane towards its abnormal position, said valve means acting to substantially close off the ram pressure branch so long as the vane is in its normal position, but by reason of subjection of the vane to extraordinary ram pressure, acting to close off the ambient pressure branch upon movement of the vane to abnormal position.

2. The combination of claim 1, including additionally a member operatively connected to said yieldable means and to the valve means, to be held by the yieldable means in a normal position of equilibrium so long as the valve means is in its normal position, and means sensitive to rate-of-pressure-change of the ambient static pressure, operatively connected to said member to shift the latter, and the valve means, in opposition to said yieldable means, from the normal position during increase of pressure at a rate in excess of the rate attained during normal flight, for instance, as in diving.

3. The combination of claim 1, including a cylinder and a piston reciprocable therein, and the space within the cylinder at one face of the piston being freely open to ambient pressure, and the corresponding space at the other face of the piston being open to like pressure by way of a restricted bleed port, whereby said piston is shiftable from a normal position of equilibrium under the influence of a pressure difference at its opposite faces during rapid descent, said piston being operatively connected to said valve means to shift the latter at such time from its normal position, in opposition to said yieldable means.

4. The combination of claim 1, wherein the vane is disposed within the ram pressure branch, transversely to the direction of ram air flow, for impingement thereby.

5. For use in an aircraft, in combination with a fuel tank, a vent pipe formed at one end with two branches, and communicating at its opposite end with the interior of said tank, one of said branches opening to the surrounding atmosphere forwardly of the direction of flight for intake of ram pressure, and the other branch opening to ambient pressure, valve means in the form of a vane located at the juncture of said branches and of a size and shape to substantially close each such branch, and supported for movement between a normal position wherein it is subjected to impingement and movement by the ram pressure, and wherein it substantially closes off the ram pressure branch from the vent pipe and opens the ambient pressure branch to the vent pipe, and an abnormal position wherein it opens the ram pressure branch to the vent pipe under the influence of such impingement and substantially closes off the ambient pressure branch to the vent pipe, resiliently yieldable means resisting such movement to the abnormal position, said yieldable means being of a strength chosen to retain said vane in its normal position, in opposition to ram pressure upon said vane at all normal forward velocities, but to yield for movement of the vane to its abnormal position by extraordinary ram pressure, such as may occur during diving.

6. For use in an aircraft, in combination with a fuel tank, a vent pipe formed at one end with two branches, and communicating at its opposite end with the interior of said tank, one of said branches opening to the surrounding atmosphere forwardly of the direction of flight, for intake of ram pressure, and the other branch opening to ambient pressure, valve means arranged to substantially close off alternatively the ram pressure branch or the ambient pressure branch from the vent pipe, while leaving the other such branch open in each case, a member operatively connected to said valve means, yieldable means operatively connected to the valve means and to said member, to hold the member in a normal position of equilibrium and the valve means in a normal position, substantially closing off the ram pressure branch and opening the ambient pressure branch, but yieldable for movement of each of the member and the valve means to an abnormal position, opposite to its normal position, and means sensitive to rate-of-pressure-change of the ambient static pressure, operatively connected to said member and to the valve means, and held by the yieldable means in a normal position of equilibrium, but shiftable from such normal position of equilibrium by increase of pressure at a rate in excess of the rate attained during normal flight, for instance, during diving.

References Cited in the file of this patent

UNITED STATES PATENTS

| | | |
|---|---|---|
| 1,715,202 | Lewis | May 28, 1929 |
| 2,136,403 | Vance et al. | Nov. 15, 1938 |
| 2,345,547 | Roth et al. | Mar. 28, 1944 |
| 2,383,369 | Curtis | Aug. 21, 1945 |
| 2,507,044 | Palmatier | May 9, 1950 |

FOREIGN PATENTS

| | | |
|---|---|---|
| 653,667 | Great Britain | May 23, 1951 |